6863X
J. Lammon.
Thrashing Mach.
Patented Dec. 14, 1831.
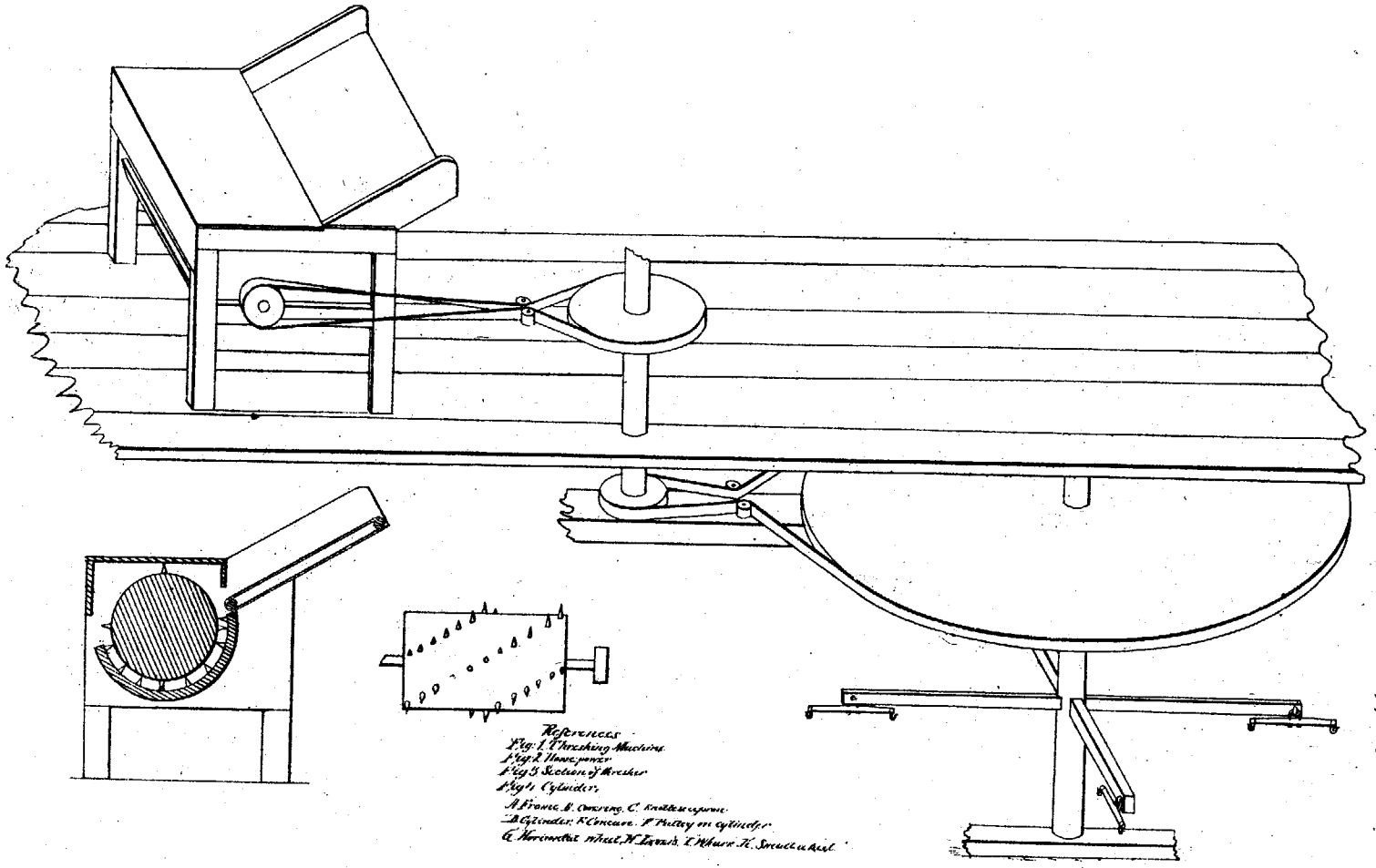

6863X Dec 14. 1831 171

John Lammon

The Schedule referred to in these Letters Patent and making part of the same, containing a description in the words of the said John Lammon him-self, of his "improvement in the Threshing Machine & Horse Power." ——

This invention is adapted to the threshing of Wheat, Rye, Oats &c. The thresh-ing Machine consists in its general construction of a horizontal Cylinder, resting in a frame about three feet and six inches in height and about three and a half feet square, underneath the cylinder and nearly in contact with it, is placed a bedpiece of the same length of the Cylinder and about twelve inches in width, the upper side being concave to correspond with the circle of the Cylinder. The Cylinder is supplied with three spiral rows of short metal teeth extending the whole length of the Cylinder and in rows about half an inch apart, and the bed piece with eight rows of similar teeth, between which, those of the Cylinder pass when the machine is in operation. A horizontal covering extends over the Cyl-inder and top of the frame and serves to bind the frame together. on one side of the Cylinder a board or front piece extends from the covering downwards nearly to the centre of the Cylinder. at that point is con-nected with the frame an apron the width of the frame and about three feet in length placed on an angle of about forty five degrees descend-ing towards the machine. At the termination of the apron on the machine an apperture is formed between it and the front piece, through which the material to be threshed passes from the apron to the Cylinder. The cylinder is put in a quick motion by horse or other power, and the grain being spread out upon the apron and brought in contact with the cylinder by its motion, is drawn through between the teeth of the Cylinder and those of the bed piece, and by this operation the grain is separated from the straw. The improvement in the threshing ma-chine hereby intended to be patented and secured, consists in the form Drawing

6863X form of the teeth of the cylinder and bed piece and in altering the
set and position of the teeth by moving the bed piece or cylinder. —
The teeth should be about three eighths of an inch in diameter, and
project about three fourths of an inch from the surface of the cyl-
-inder and bed piece, and be of a true taper from their surface to
the outer end, and terminate in a point. The bed piece is so placed
in the frame as by its elevation or depression, the teeth of the bed
piece and cylinder, are separated or brought nearly in contact,
so as to be adapted to the different kinds and situations of the grain
intended to be thrashed. The same end may be attained by the eleva-
-tion and depression of the cylinder. — The Horse power consists
of a horizontal wheel of about twenty four feet in diameter with a
perpendicular shaft about sixteen inches in diameter, and about eight
feet in height, one end turning upon an axis in a bed piece on the
ground or floor, and the other in a permanently secured beam or
frame. The wheel is placed near the upper end of the shaft. A band con-
-sisting of a strap, cord or chain, passes round the periphery of the
wheel, and round a whirl of about twelve in diameter, on a perpendic-
-ular shaft about six feet in length. The whirl being placed near
the lower end of the shaft and at the upper end of the same and connec-
-ted therewith is a horizontal wheel about four feet in diameter around
which passes a similar band to a whirl on the cylinder of the thrashing
machine, of about three inches in diameter. Near the periphery of the large
wheel above mentioned are placed two perpendicular rollers about
six inches apart between which the band of the main wheel is made
to pass on its way to the whirl with which that band is connected. —
Near the periphery of the four <u>feet</u> wheel is also <u>place</u> two similar
perpendicular rollers about three inches asunder to guide in a similar
manner the band of that wheel in its passage to the whirl on the axis
of the cylinder. The band on the four feet wheel passes to the whirl with
which it is connected with a twist or crossing so as to be adapted to
the perpendicular position of the whirl. The six feet shaft above 6863X 172 mentioned (having at its ends the wheere and wheel as above described)
may be placed in a horizontal position, and in this case the twist of
the band above mentioned is dispensed with, and a similar crossing is
made in the band from the large wheel. The wheere on the six foot shaft
above mentioned may be placed at any convenient distance from
the large wheel, as likewise may be the wheere on the cylinder of the
thrashing machine from the four foot wheel, and the whole when
thus arranged is propelled by horses attached to cross beams passing
through the shaft of the main wheel. The dimensions, proportions and
sizes of the different parts of the Machinery above described, may be va-
-ried as convenience may require, or according to the fancy of the builder,
and the materials may be of either wood, iron, or other metal, as may
be deemed most expedient, and the above construction of wheels, and
bands may be adapted to any machinery whether driven by hand, horse
power, water, or steam.

Witnesses
Israel I. Richardson
Nathan Noyes

John Lammon

Exd
M.J.C.

Patented December 14. 1831

(980 words)

Certificate appended dated Oct. 1. 1836 sign'd H. L. Ellsworth.